United States Patent
Ross et al.

(10) Patent No.: US 9,030,921 B2
(45) Date of Patent: May 12, 2015

(54) INCREASED SPECTRAL EFFICIENCY AND REDUCED SYNCHRONIZATION DELAY WITH BUNDLED TRANSMISSIONS

(75) Inventors: John Anderson Fergus Ross, Niskayuna, NY (US); Michael James Hartman, Clifton Park, NY (US); John Erik Hershey, Ballston Lake, NY (US); Richard Louis Zinser, Niskayuna, NY (US); Xiaolei Shi, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/154,231

(22) Filed: Jun. 6, 2011

(65) Prior Publication Data

US 2012/0307617 A1    Dec. 6, 2012

(51) Int. Cl.
*G11B 20/10*    (2006.01)
*G11B 20/14*    (2006.01)

(52) U.S. Cl.
CPC .......... *G11B 20/10222* (2013.01); *G11B 20/14* (2013.01); *G11B 20/1426* (2013.01)

(58) Field of Classification Search
USPC .............. 369/103, 94, 84, 47.16, 47.19, 47.2, 369/59.19, 59.21–59.24, 59.27, 369/124.02–124.06
See application file for complete search history.

(56) References Cited

U.S. PATENT DOCUMENTS

| | | | |
|---|---|---|---|
| 4,672,480 A * | 6/1987 | Yamamoto | 360/39 |
| 5,506,825 A * | 4/1996 | Gushima et al. | 369/47.16 |
| 5,642,242 A * | 6/1997 | Ozaki et al. | 360/48 |
| 6,381,210 B1 * | 4/2002 | Alon et al. | 369/124.02 |
| 6,567,364 B1 * | 5/2003 | Takahashi et al. | 369/124.02 |
| 6,804,187 B2 * | 10/2004 | Miyanabe et al. | 369/124.14 |
| 2004/0218672 A1 * | 11/2004 | Bourne et al. | 375/240.12 |
| 2007/0225842 A1 * | 9/2007 | Smith et al. | 369/14 |
| 2007/0291840 A1 * | 12/2007 | Tsuru | 375/240.12 |
| 2008/0253463 A1 * | 10/2008 | Lin et al. | 375/240.25 |
| 2009/0074077 A1 * | 3/2009 | Lakus-Becker | 375/240.25 |
| 2009/0083044 A1 * | 3/2009 | Briand et al. | 704/500 |
| 2010/0007984 A1 * | 1/2010 | Nakagawa | 360/75 |
| 2010/0079316 A1 * | 4/2010 | Okuno et al. | 341/100 |
| 2010/0149958 A1 * | 6/2010 | Hershey et al. | 369/275.3 |
| 2011/0196688 A1 * | 8/2011 | Jones | 704/503 |
| 2011/0267933 A1 * | 11/2011 | Ross et al. | 369/47.15 |
| 2011/0274156 A1 * | 11/2011 | Mighani et al. | 375/240.02 |

OTHER PUBLICATIONS

Graell I Amat, et al., "Optimal High-rate Convolutional Codes for Partial Response Channels", Global Telecommunications Conference, 2002. GLOBECOM '02.IEEE pp. 1031-1036.

(Continued)

*Primary Examiner* — Thang Tran
(74) *Attorney, Agent, or Firm* — Jean K. Testa; Fletcher Yoder, P.C.

(57) ABSTRACT

Techniques are provided for increasing spectral efficiency over data channels in a storage or communication system. In some embodiments, data may be encoded and transmitted over multiple channels. The transmitted data from the multiple channels may be considered together as a channel bundle, thereby increasing the edge transitions of the group of signals to improve clock recovery and reduce coding constraints. In some embodiments, the channel bit size is reduced to maximize data rates based on the reduced coding constraints. Furthermore, the channel bundle has only one channel with timing markers, so that a receiver may receive information from the channel bundle and recover clocking based on the timing markers in the one channel.

17 Claims, 4 Drawing Sheets

(56) References Cited

OTHER PUBLICATIONS

Liao et al., "A New High Rate Code Scheme With Highly Parallel and Low Complexity Decoding Algorithm," IEEE Communications Letters, vol. 8, No. 6, pp. 386-387 (Jun. 2004).

Ke et al., "A New Construction for n-track (d, k) Codes with Redundancy", Information Theory, IEEE Transactions on vol. 41, Issue 4, (Jul. 1995) pp. 1107-1115.

* cited by examiner

INCREASED SPECTRAL EFFICIENCY AND REDUCED SYNCHRONIZATION DELAY WITH BUNDLED TRANSMISSIONS

BACKGROUND

The subject matter disclosed herein relates to optical systems, and more particularly, to techniques for transmitting data in optical systems.

Optical technologies have advanced along with the desire for greater efficiency over optical channels. In particular, optical storage technologies and optical communication systems have been developed for increased storage capacity and increased data rates.

One example of the developments in optical storage technologies may be the progressively higher storage capacities for optical storage systems. For example, the compact disc, developed in the early 1980s, has a capacity of around 650-700 MB of data, or around 74-80 min. of a two channel audio program. In comparison, the digital versatile disc (DVD) format, developed in the early 1990s, has a capacity of around 4.7 GB (single layer) or 8.5 GB (dual layer). Furthermore, even higher capacity storage techniques have been developed to meet higher demands, such as the demand for higher resolution video formats. For example, high-capacity recording formats, such as the Blu-ray Disc™ format, is capable of holding about 25 GB in a single-layer disc, or 50 GB in a dual-layer disk. As computing technologies continue to develop, storage media with even higher capacities may be desired. For example, holographic storage systems and micro-holographic storage systems are examples of other developing storage technology that may achieve future capacity requirements in the storage industry.

Along with increases in data capacity, high data rates are also desired. For example, the video bit rate for a standard DVD format may be about 9.8 Mbps, and the video bit rate for a standard Blu-ray Disc™ format may be about 40.0 Mbps. Data rate increases may also be expected as higher capacity storage systems (e.g., holographic or micro-holographic storage systems) are developed. Furthermore, increased data rates in optical communications systems (e.g., transmittance of optical signals over fiber, water, free space, etc.) may also be desirable.

Data rates in optical systems may be at least partially limited by the speed at which data may be transmitted. Methods for increasing the efficiency of data transmission over optical channels may improve data rates and/or accuracy in optical systems.

BRIEF DESCRIPTION

An embodiment of the present techniques provides a method of transmitting optical data. The method involves transmitting data over a channel bundle having multiple optical channels, where the data transmitted over the channel bundle is arranged to be decoded together.

Another embodiment provides a method of receiving optical data. The method includes receiving optical data from a channel bundle having multiple optical channels and recovering source data from the received optical data using one decoder.

Another embodiment provides an optical system having an encoder system, a transmitter, a receiver system, and a decoder. The encoder system is configured to encode source data into optical data to be transmitted over a channel bundle having multiple optical channels. The transmitter is configured to transmit the optical data through the channel bundle. The receiver system is configured to receive the optical data from the channel bundle, and only one decoder is configured to decode the optical data.

Yet another embodiment provides an optical storage system having one or more encoders, an optical head, a multi-head detector, and clock recovery circuitry. The one or more encoders encodes source data into optical data to be recorded on multiple data tracks of an optical storage disk. The optical head is configured to impinge a beam on each of the multiple data tracks to record the optical data in the multiple data tracks. The multi-head detector has multiple detector heads, which are each configured to detect recorded data from each of the multiple data tracks. The clock recovery circuitry is configured to process the recorded data from each of the multiple data tracks together to recover the source data.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more embodiments of the present techniques will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for one of ordinary skill having the benefit of this disclosure.

The present techniques disclose systems and methods for increasing spectral efficiency over channels in an optical system. An optical system may include systems which transmit information using light (e.g., a laser) as a medium, and may include, for example, optical storage systems and optical communications systems. Optical channels may refer to communication paths in an optical system, such as a path between an optical disk and an optical head (e.g., a read/write head, a detector) in an optical storage system, or a path between a transmitter and a receiver in an optical communications system. Such channels may include, for example, fiber, water, or free space, etc. in different types of optical systems. Spectral efficiency may refer to the data rate or information rate of data transmittance over optical channels.

Optical systems typically involve encoding data to be transmitted as optical data, and then receiving and decoding the data to obtain information corresponding to the original data source. For example, in optical storage systems, data may be recorded or written to an optical disk by directing a recording beam and a reference beam from an optical head to a data position in the optical disk. The beams may interfere to modulate the refractive index of the photosensitive material in the optical disk to write data in the form of optical data (e.g., holograms or micro-holograms). To retrieve the stored optical data, an optical head may direct a reading beam to the optical disk and receive transmissions, reflections, and/or scatterings of the beam from the optical data in the disk. The transmissions, reflections, and/or scatterings may be processed into a bit stream and decoded to reconstruct data corresponding to the originally encoded and recorded data.

Figure 1:
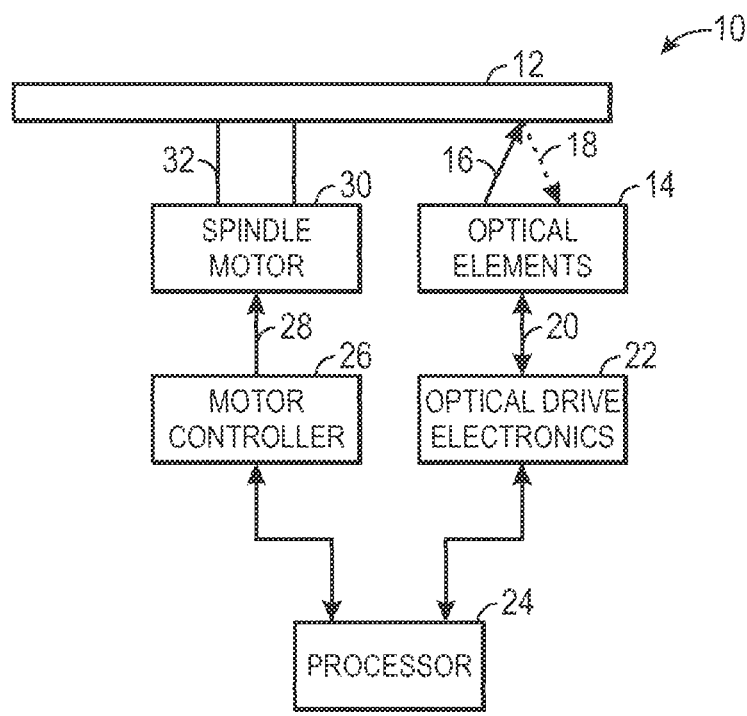
FIG. 1 is a block diagram of an optical storage system, in accordance with embodiments.

An example of an optical storage system is provided in FIG. 1. An optical storage system 10 may involve reading data from and/or recording data to optical storage disks 12. In one embodiment, the optical storage system 10 may be a holographic storage system, and the optical disk may be a holographic disk 12. The data stored on the optical disk 12 may be read by a series of optical elements 14, which may be suitable for emitting beams 16 (e.g., a reading beam or a recording beam) and receiving reflections 18 (e.g., including light scatter, reflection, and/or diffraction of the beams 16 by the medium of the disk 12) of the beams from the optical disk 12. The optical elements 14 may include any number of different elements designed to generate excitation beams (e.g., lasers), or other elements such as an optical head configured to focus the beams 16 on the optical disk 12 and/or detect the reflections 18 coming back from the optical disk 12. The optical elements 14 are controlled through a coupling 20 to an optical drive electronics package 22. The optical drive electronics package 22 may include such units as power supplies for one or more laser systems, detection electronics to detect an electronic signal from the detector, analog-to-digital converters to convert the detected signal into a digital signal, and other units such as a bit predictor to predict when the detector signal is actually registering a bit value stored on the optical disk 12.

The location of the optical elements 14 over the optical disk 12 is controlled by servo-mechanical devices controlled by a processor 24. In some embodiments in accordance with the present techniques, the processor 24 may be capable of determining the position of the optical elements 14, based on sampling information which may be received by the optical elements 14 and fed back to the processor 24. The processor 24 also controls a motor controller 26 which provides the power 28 to a spindle motor 30. The spindle motor 30 is coupled to a spindle 32 that controls the rotational speed of the optical disk 12. As the optical elements 14 are moved from the outside edge of the optical disk 12 closer to the spindle 32, the rotational speed of the optical disk may be increased by the processor 24. This may be performed to keep the data rate of the data from the holographic storage disk 12 essentially the same when the optical elements 14 are at the outer edge as when the optical elements are at the inner edge.

Figure 2:
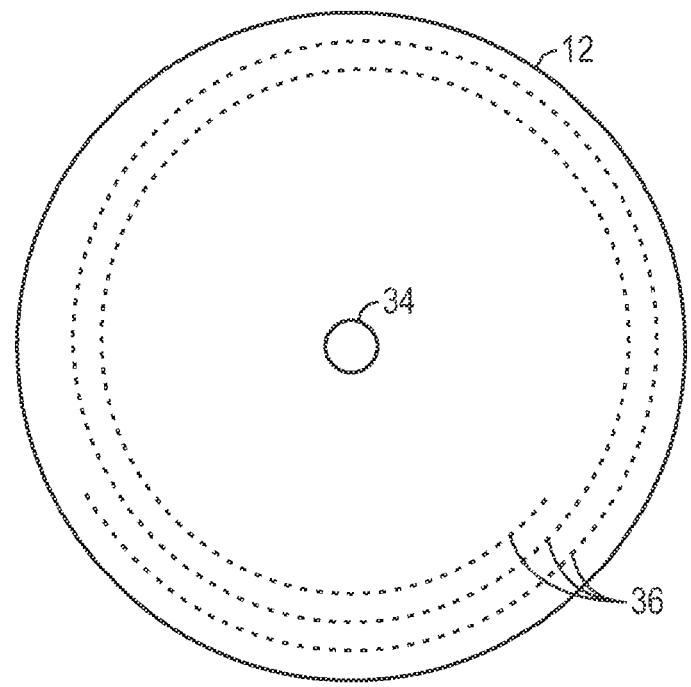
FIG. 2 illustrates an optical disk having data tracks, in accordance with embodiments.

The system 10 may be used to read an optical disk 12 containing data, as shown in FIG. 2. Generally, the optical disk 12 is a flat, round disk with a recordable medium embedded in a transparent protective coating. The protective coating may be a transparent plastic, such as polycarbonate, polyacrylate, and the like. A spindle hole 34 of the disk 12 couples to the spindle (e.g., the spindle 32 of FIG. 1) to control the rotation speed of the disk 12. On each layer, data may be generally written in a sequential spiraling track 36 from the inner limit of the disk 12 to an outer edge, although circular tracks, or other configurations, may be used. The data layers may include any number of surfaces that may reflect light, such as micro-holograms which may be used for bit-wise holographic data storage, or a reflective surface with pits and lands.

It should be noted that while the example of an optical system as provided in FIGS. 1 and 2 relate to optical storage (or holographic storage), the present techniques of increasing spectral efficiency may apply to any type of data storage or data transmission system. For instance, the present techniques may be implemented in data storage systems such as magnetic storage systems and data transmission systems such as communication systems. In particular, the present techniques may apply to any type of system which involves the transmitting and receiving of data over a channel and/or over multiple channels (e.g., a channel bundle).

Typically, optical data may be encoded with Run-length Limited (RLL) codes. RLL codes may be suitable for optical systems, as information may be encoded as optical data to be transmitted over optical channels. Typically, RLL codes constrain the intervals, also referred to as runs, of consecutive symbols (i.e., bits). More specifically, the shortest run of consecutive symbols (i.e., minimum runlength) is constrained such that short transmission symbols may be distinguishable. The longest run of consecutive symbols (i.e., maximum runlength) is constrained such that the transmitted signal may have enough signal transitions for clock recovery. Therefore, channel bits are typically encoded to meet the constraints of the shortest run constraint, typically denoted as d+1, and the longest run constraint, typically denoted as k+1.

Figure 3:
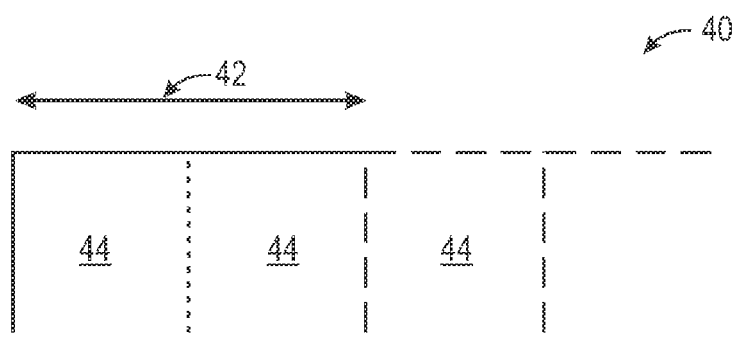
FIG. 3 is a diagram representing channel bits in a minimum runlength time for Run-length Limited (RLL) encoded data.

A diagram representing encoded channel bits having a minimum runlength of two (d=1) is provided in FIG. 3. The data stream 40 of FIG. 3 may have a minimum runlength of channel bits 44 (also referred to as consecutive symbols 44) that is greater than or equal to the minimum time 42. The minimum time 42, also referred to as the minimum runlength time 42, may be the length of time for transmitting the minimum runlength of consecutive symbols 44. Coding techniques which constrain the number of symbols 44 in a data stream 40 also limit the amount of information communicated in transmitting the data stream 40. For instance, a sequence of r q-bit symbols may have less than $q^r$ bits of information, meaning the amount of information transmitted per channel bit 44 may be less than the size of each channel bit 44. Such a condition may indicate a failure to maximize spectral efficiency in the optical channels. For example, a binary modulation using a (1,7) RLL code relays approximately ⅔ of a bit of information per channel bit.

Figure 4:
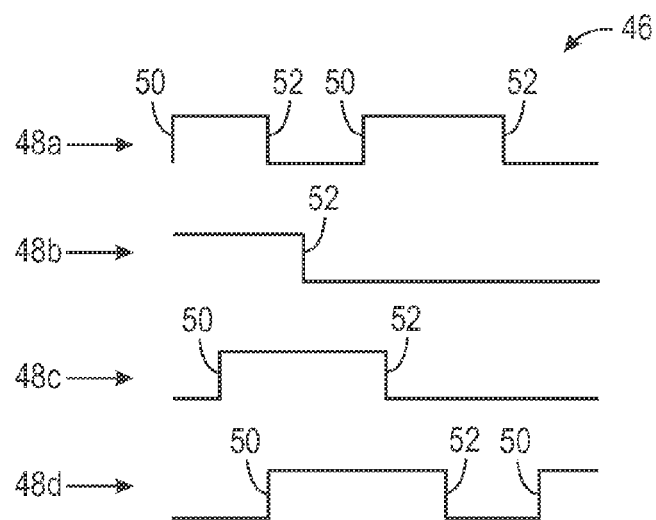
FIG. 4 illustrates a group of signals from a channel bundle, in accordance with embodiments.

In one or more embodiments, multiple channels may be transmitted and/or received as a group to increase spectral efficiency. For example, signals from a group of multiple channels, referred to as a channel bundle, are illustrated in FIG. 4. The group of signals 46 may include multiple signals 48a-d, each from a different data channel in an optical system. For example, in an optical storage system, each of the signals 48a-d may be from a different data track 36 on an optical disk 12.

During a transmission of the group of signals 46, all of the signals 48a-d may be considered together as a group. Such a technique may be referred to as channel bundling, and may be used to improve synchronization time and clock recovery in comparison to typical techniques of considering one signal (e.g., 48a) individually. A group of signals 46 typically has a greater number of transitions from high to low or from low to high (e.g., the rising edges 50 and falling edges 52) in comparison to an individual signal 48. The more frequent edge transitions in the group of signals 46 may provide improved clock recovery, thereby reducing the RLL coding constraint of the maximum runlength for each individual data channel (e.g., the corresponding data channels for each of the signals 48a-d).

Figure 5:
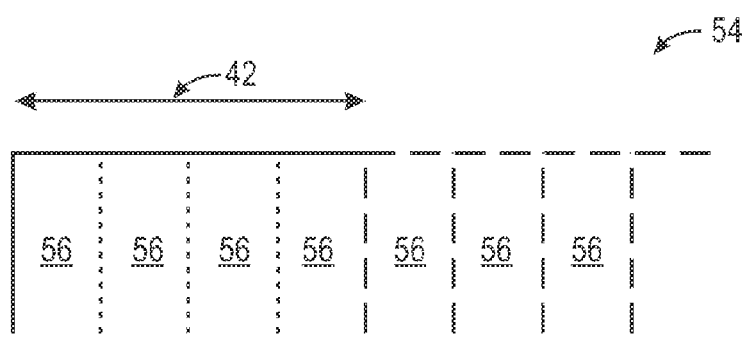
FIG. 5 is a diagram representing channel bits having decreased channel bit size in a minimum runlength time for RLL encoded data, in accordance with embodiments.

By using channel bundling to reduce the constraint of the maximum runlength for each data channel, certain adjustments to the channel bit size may be made to increase spectral efficiency. For example, in some embodiments, the size of each channel bit may be decreased. In some embodiments, the channel bit size may be decreased while the minimum runlength is maintained to increase data rates (e.g., the information transmitted by a bit stream during the minimum runlength time). For example, the diagram illustrated in FIG. 5 represents a data stream 54 having channel bits 56 with decreased size (e.g., in comparison to the channel bits 44 of FIG. 3). The channel bits 56 illustrated in FIG. 5 may be approximately half the size as the channel bits 44 illustrated in FIG. 3, such that during the minimum runlength time 42, approximately 4 channel bits 56 may be transmitted, in comparison to the 2 channel bits 44 transmitted when the channel bit size is not decreased.

In some embodiments, decreasing channel bit size in a data stream 54 may improve the information capacity of a data stream 54 within the bounds of the RLL code constraints, thereby improving spectral efficiency of the optical system. Even if a weaker code (e.g., one having a smaller information yield per bit) is used, the overall data rate may still be increased. For example, assuming the code used for the data stream 40 of FIG. 3 has two channel bits 44 in the minimum runlength time 42 and a data rate of 0.667 per channel bit 44, the information capacity of the data stream 40 during time 42 may be approximately 1.33. Assuming the code for the data stream 54 of FIG. 5 has 4 channel bits 56 in the minimum runlength time 42 and a data rate of 0.390 per channel bit 56 (e.g., a weaker code than the one used for the bit stream 40 of FIG. 3), the information capacity of the data stream 54 during the time 42 may be approximately 1.56. Therefore, even assuming a weaker code, the decreased channel bit size of the channel bits 56 used in the data stream 54 may result in an increase (e.g., by approximately 17%) in data rate. Due to the increased signal transitions (e.g., edges 50 and 52 from FIG. 4) when considering signals from a group of channels (e.g., the group of signals 46), synchronization time may also be reduced.

Different channel bit lengths may also be used in different embodiments. For example, while the data stream 54 in FIG. 5 is illustrated as having 4 channel bits 56 during the minimum runlength time 42, in different embodiments, different numbers of channel bits may be transmitted during a minimum runlength time 42. For example, channel bundling may be used with a data stream 40 having an unchanged channel bit size (e.g., the same size of the channel bit 44), which may result in greater clock stability. In some embodiments, 3, 5, or more channel bits may be transmitted during a minimum runlength time 42. Furthermore, in different embodiments, decreasing channel bit size to increase the channel bits transmitted in a bit stream may result in additional channel bits for coding gain. For example, channel codes using data rates of $8/9$, $12/13$, and $16/17$ at the previously calculated 17% data rate increase may have resulting data rates of 1.04, 1.08, and 1.19 (i.e., $1.17*8/9$, $1.17*12/13$, and $1.17*16/17$, respectively). Assuming a bit error rate (BER) of $1*10^{-4}$, using decreased channel bit size may result in gains of 3 to 4 data bytes for the $8/9$ data rate code in some embodiments, or gains of 4 or 5 data bytes for different codes assuming a BER of $1*10^{-5}$.

The transmission and consideration of a group of signals from multiple channels may also involve providing timing information. In some embodiments, timing markers may be positioned in intervals of select data channels during signal transmission of the channel bundle. In typical data transmissions, encoding timing markers in a single channel may be costly with respect to data rates and spectral efficiency, as additional bit positions from each channel may be designated for timing markers to provide timing information. By encoding timing markers in a single channel of a channel bundle, channel space may be preserved in the remaining channels of the channel bundle, thereby reducing overhead. Furthermore, encoding timing markers on a single channel of a channel bundle may enable clock recovery of all signals from the channel bundle, based on the timing markers on the single channel.

Figure 6:
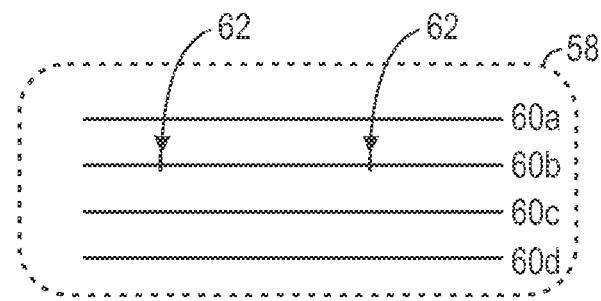
FIG. 6 illustrates timing markers in channel bundle, in accordance with embodiments.

FIG. 6 illustrates a channel bundle 58 having multiple channels 60a-d, including one channel 60b having encoded timing markers 62. While timing information is provided by the timing markers 62 in the channel 60b, the remaining channels 60a, 60c, and 60d of the channel bundle 58 may not need to have timing markers. Therefore, the timing markers 62 in one channel 60b may provide timing information for the entire channel bundle 58, and channel bit positions in the remaining channels 60a, 60c, and 60d need not be reserved for timing markers.

Figure 7:
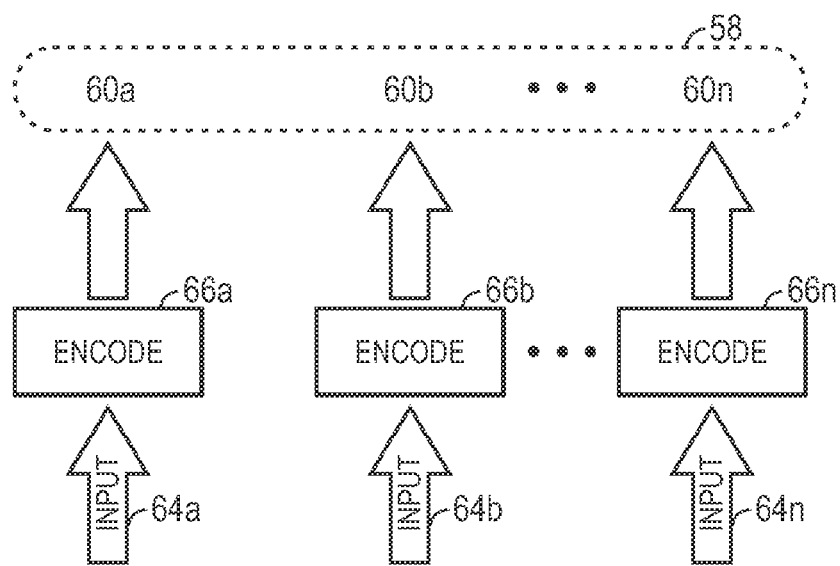
FIG. 7 is a block diagram representing an encoding system using multiple encoders to output encoded data to a channel bundle, in accordance with embodiments.

Transmission of multiple channels of optical data may involve different encoding techniques. For example, in the block diagram of FIG. 7, inputs 64a, 64b, and 64N may represent different portions of the information to be separately encoded (blocks 66a, 66b, and 66N) and transmitted over channels 60a, 60b, and 60N of a channel bundle 58. As represented in FIG. 7, a channel bundle 58 may have N number of channels 60, and the transmission of each channel 60 may involve the individual input and encoding of information to be transmitted through that channel 60. The channels 60 may be isolated by, for example, wavelength and/or space and/or polarization. For example, in an optical storage system, data may be individually encoded (blocks 66a, 66b, and 66N) and recorded to spatially separate data tracks 36 in an optical disk 12. Furthermore, in some embodiments, multiple channel bundles 58 may be input, encoded, and recorded simultaneously.

Figure 8:
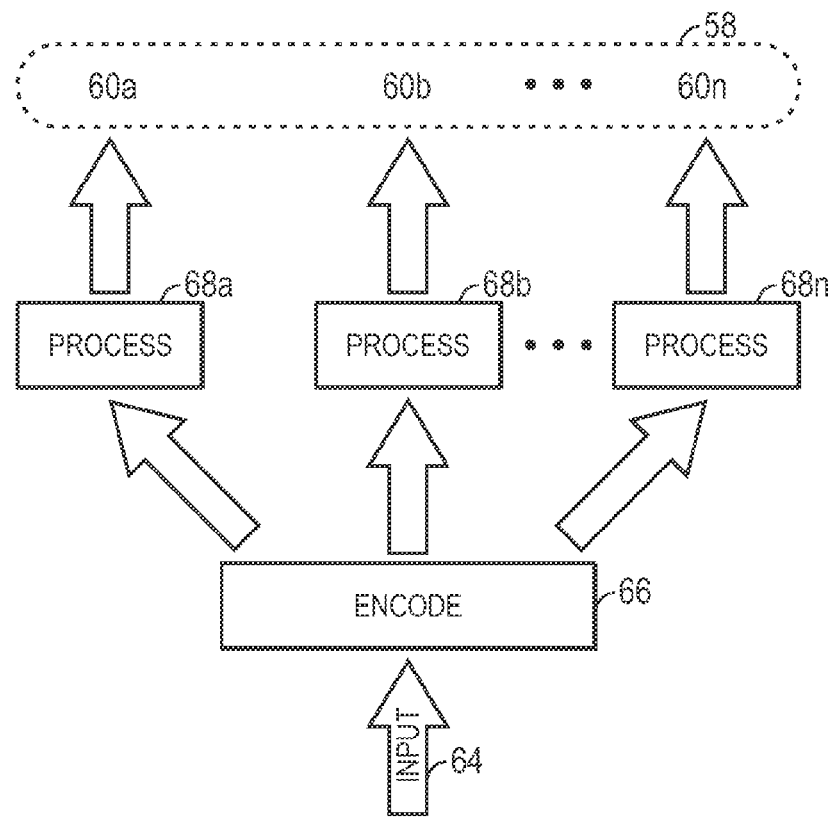
FIG. 8 is a block diagram representing an encoding system using a common encoder to output encoded data to a channel bundle, in accordance with embodiments.

Another embodiment of an encoding system for channel bundling is provided in FIG. 8, where one input 64 is encoded (block 66) and separately processed (blocks 68a, 68b, and 68N) to be transmitted over different channels 60a, 60b, and 60N. Therefore, information may be input and encoded together before it is separated into different channels. As discussed, the channels 60 may be isolated by wavelength and/or space and/or polarization. For example, in an optical storage system 10, different portions of the input 64 may be encoded (block 66) and separately processed to be recorded as multiple channels 60a, 60b, and 60N in one channel bundle 58. Each of the multiple channels 60a, 60b, and 60N may be on separate data tracks 36 in an optical disk 12. As discussed, more than one channel bundle 58 may be encoded, processed, and recorded simultaneously.

Figure 9:
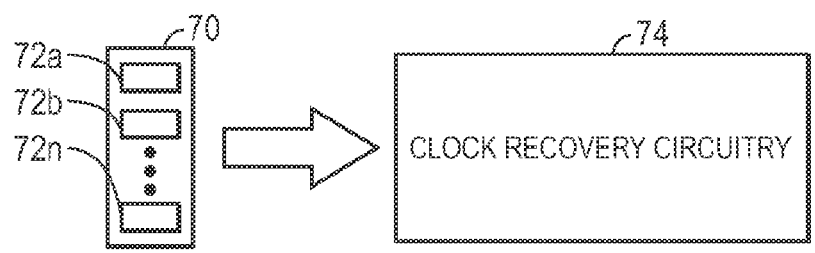
FIG. 9 is a block diagram representing a decoding system using a multi-head decoder and clock recovery circuitry to receive and clock data from a channel bundle, in accordance with embodiments.

To receive information from the channel bundle 58, a receiver system may receive data from each of the parallel channels 60 and conduct parallel clock recovery and synchronization on the data from the parallel channels. FIG. 9 illustrates a receiver system 70 having separate receivers 72 for receiving data from each channel 60. For instance, data from channel 60a may be received at receiver 72a, data from channel 60b may be received at receiver 72b, and so forth. Once the data from the channel bundle 58 is received at the receiver system 70, the data may be processed at a clock recovery circuit 74 for clock and data recovery. For example, in an optical storage system 10, the receiver system 70 may be a multi-head detector 70 (e.g., part of the optical elements 14) and may have multiple detector heads 72 each suitable for detecting reflections, scatterings, and/or diffractions of optical data from an optical disk 12. The multi-head detector 70 may transmit the data from channel bundle 58 to the clock recovery circuitry 74 which may be, for example, a digital signal processor (e.g., processor 24) or an application-specific integrated circuit in the optical storage system 10. While detected signals may be processed separately for clock and data recovery in typical systems, in accordance with the present techniques, substantially all the data detected at the multi-head detector 70 may be considered together (i.e., in parallel) at the clock recovery circuitry 74 for clock and data recovery. In some embodiments, the clock recovery circuitry 74 may be suitable for parallel clock recovery and synchronization. For example, in some embodiments, the clock recovery circuitry 74 may have one or more microprocessors or controllers recovering clock information of the data in parallel.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of communicating data, the method comprising:
    encoding source data into encoded data;
    transmitting the encoded data over a channel bundle comprising multiple channels, wherein the multiple channels comprise only a single channel with a timing marker;
    receiving the encoded data from the multiple channels with a decoder, wherein the encoded data received by the decoder from the multiple channels transmitted over the channel bundle is decoded together jointly; and
    recovering clock information from the single channel of the channel bundle with the timing marker.

2. The method of claim 1, comprising:
    encoding the source data using a run-length limited (RLL) encoding scheme, wherein the source data is encoded to meet a minimum runlength constraint of the RLL encoding scheme.

3. The method of claim 2, wherein the source data is encoded to meet a maximum runlength constraint.

4. The method of claim 1, wherein encoding the source data comprises separately encoding multiple data streams, wherein each of the multiple data streams is to be recorded to one of multiple data tracks.

5. The method of claim 1, wherein encoding the source data comprises:
    encoding the data to produce one encoded data stream; and
    processing the one encoded data stream into multiple data streams, wherein each of the multiple data streams is to be recorded to one of multiple data tracks.

6. The method of claim 1, wherein receiving the encoded data from the channel bundle comprises detecting the encoded data from multiple data tracks of a holographic disk, wherein each of the multiple data tracks corresponds with one of the multiple channels.

7. A method of communicating digital data, the method comprising:
    encoding source data into encoded digital data;
    receiving encoded digital data from a channel bundle comprising multiple channels, wherein the multiple channels comprise only a single channel with a timing marker;
    recovering the source data from the received encoded digital data using one decoder, wherein the encoded digital data from the multiple channels is decoded by the decoder jointly and in parallel; and
    recovering clock information from the single channel with the timing marker of the multiple channels.

8. The method of claim 7, comprising:
    providing the clock information in the first channel of the multiple channels.

9. An optical system, comprising:
    an encoder system configured to encode source data into encoded data to be transmitted over a channel bundle comprising multiple channels;
    a transmitter configured to transmit the encoded data through the channel bundle;
    a receiver system configured to receive the encoded data from the channel bundle;
    only one decoder configured to jointly decode the encoded data into source data, wherein the encoded data is from multiple channels and is decoded by the decoder jointly and in parallel; and
    a clock recovery circuit configured to recover clock information of the channel bundle by using the edge transitions of the data from the multiple channels.

10. The optical system of claim 9, wherein the encoder system is configured to encode the source data into encoded data using a run-length limited (RLL) code.

11. The optical system of claim 9, wherein the encoder system is configured to constrain the encoded optical data by a minimum runlength constraint.

12. The optical system of claim 9, wherein the encoder system comprises multiple encoders, each configured to encode a portion of the source data into a portion of the encoded data.

13. The optical system of claim 9, wherein the receiver system comprises multiple receivers, each configured to receive a portion of the encoded data from one of the multiple channels.

14. The optical system of claim 9, wherein the multiple channels are separated by one or more of space, wavelength, and polarization.

15. The optical system of claim 9, comprising an optical disk comprising the channel bundle.

16. The optical system of claim 9, wherein the edge transitions comprise transitions from high to low.

17. The optical system of claim 9, wherein the edge transitions comprise transitions from low to high.

* * * * *